United States Patent
Rayburn et al.

(10) Patent No.: US 9,113,293 B1
(45) Date of Patent: Aug. 18, 2015

(54) DISPLAYING LOCATION UNCERTAINTY OF A MOBILE DEVICE

(71) Applicant: SPRINT COMMUNICATIONS COMPANY L.P., Overland Park, KS (US)

(72) Inventors: Terry G. Rayburn, Kansas City, MO (US); Rodney D. Nelson, Overland Park, KS (US); Michael P. McMullen, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 2 days.

(21) Appl. No.: 14/084,115

(22) Filed: Nov. 19, 2013

(51) Int. Cl.
*H04W 24/00* (2009.01)
*H04W 4/02* (2009.01)
*H04W 64/00* (2009.01)
*H04W 24/02* (2009.01)
*H04W 8/18* (2009.01)

(52) U.S. Cl.
CPC ............... *H04W 4/02* (2013.01); *H04W 64/00* (2013.01); *H04W 8/18* (2013.01); *H04W 24/02* (2013.01)

(58) Field of Classification Search
CPC ....... H04W 4/02; H04W 64/00; H04W 24/02; H04W 8/18
USPC ............. 455/457, 446, 456.1, 456.2, 456.3, 455/67.11, 423, 414.1, 418, 500
See application file for complete search history.

(56) References Cited

U.S. PATENT DOCUMENTS

| 8,571,580 B2* | 10/2013 | Altman et al. ............. 455/456.3 |
| 2010/0262367 A1* | 10/2010 | Riggins et al. ............. 701/209 |
| 2011/0173576 A1* | 7/2011 | Murphy et al. ............. 715/863 |

* cited by examiner

Primary Examiner — Khai M Nguyen

(57) ABSTRACT

Methods and systems for displaying location uncertainty of locations of mobile devices are provided. A location of a mobile device may be determined using a location system. The mobile device can be associated with a location service that locates the mobile device. The location system identifies the location of the mobile device that is an approximation of the location of the mobile device. An uncertainty region for the location of the mobile device is identified. The uncertainty region determines an extent of geographic data that is displayed on a location diagram based on a correlation between the uncertainty region and the extent of geographic data. The extent of geographic data that corresponds to the uncertainty region is determined. The location associated with the uncertainty region is communicated such that the location is displayed on the location diagram with the extent of geographic data using the obscuring feature.

20 Claims, 10 Drawing Sheets

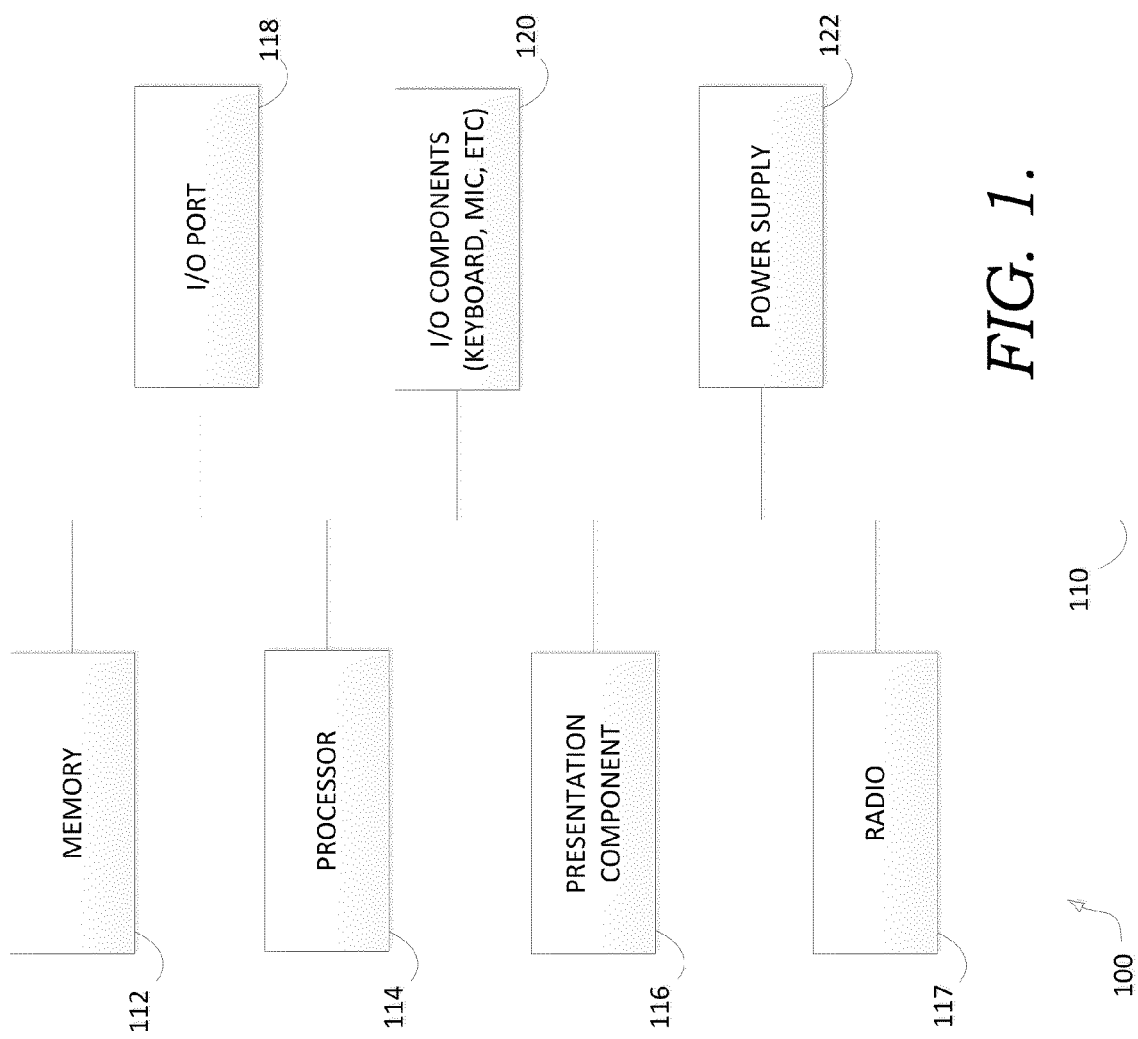

is contem-
DISPLAYING LOCATION UNCERTAINTY OF A MOBILE DEVICE

SUMMARY

A high-level overview of the invention is provided here to disclose and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, systems and methods for displaying location uncertainty of locations of mobile devices. In particular, the location of a mobile device, determined using a location system, is obscured on a location diagram with an obscuring feature (e.g. opacity-to-transparency gradient, blurring, shading, or pixilation). The location may be a central location of an uncertainty region. The location is obscured such that the location is not misidentified as the actual location of the mobile device. In this regard, the uncertainty region determines the extent of geographic data that is displayed based on a correlation between the uncertainty region and the extent of geographic data. The uncertainty region may further have a location score that indicates the likelihood of the mobile device being found in the uncertainty region. The uncertainty region may be associated with an uncertainty shape (e.g., circle). In embodiments, the uncertainty shape may have two or more sub-regions, where each may have a different likelihood of the mobile device being found within each sub-region.

By way of background, a location of a mobile device may be determined using a location system. The mobile device can be associated with a location service that provides for identifying the location of the mobile device. The location system may be, for example, a network-based, handset-based, SIM-based (Subscriber Identity Module), or Wi-Fi-based location system that identifies the location of the mobile device. In particular, a location can be determined using a radio technical method such as GPS (Global Positioning System), AFLT (Advanced Forward Link Trilateration) of cells, locations of serving radio stations, TV or FM station signal strength intersections or the like. Each type of location system provides a location of the mobile device that may be an approximation of an actual location of the mobile device.

In embodiments of the present invention, an uncertainty region refers to a property of space that extends in one or more directions such that a likelihood exists that the mobile device is located within the uncertainty region. When a location of a mobile device is determined, the approximate location may be a central location in an uncertainty region. The uncertainty region of the location of the mobile device varies with each type location system. The uncertainty region determines an extent of geographic data that is displayed based on a correlation between the uncertainty region and the extent of geographic data. In embodiments, a location score, that indicates the likelihood that the mobile device is located within the uncertainty region, is further factored into determining the extent of geographic data displayed. The location associated with the uncertainty region may be communicated such that the location is displayed on the location diagram with the extent of geographic data using an obscuring feature. The obscuring feature may include graphical elements that reveal the location at the extent of geographic data associated the uncertainty region.

BRIEF DESCRIPTION OF SEVERAL VIEWS OF THE DRAWINGS

Illustrative embodiments of the present invention are described in detail below with reference to the attached drawing figures, and wherein:

FIG. 1 depicts a block diagram of a mobile device in accordance with an embodiment of the present invention;

DETAILED DESCRIPTION

Figure 2A:
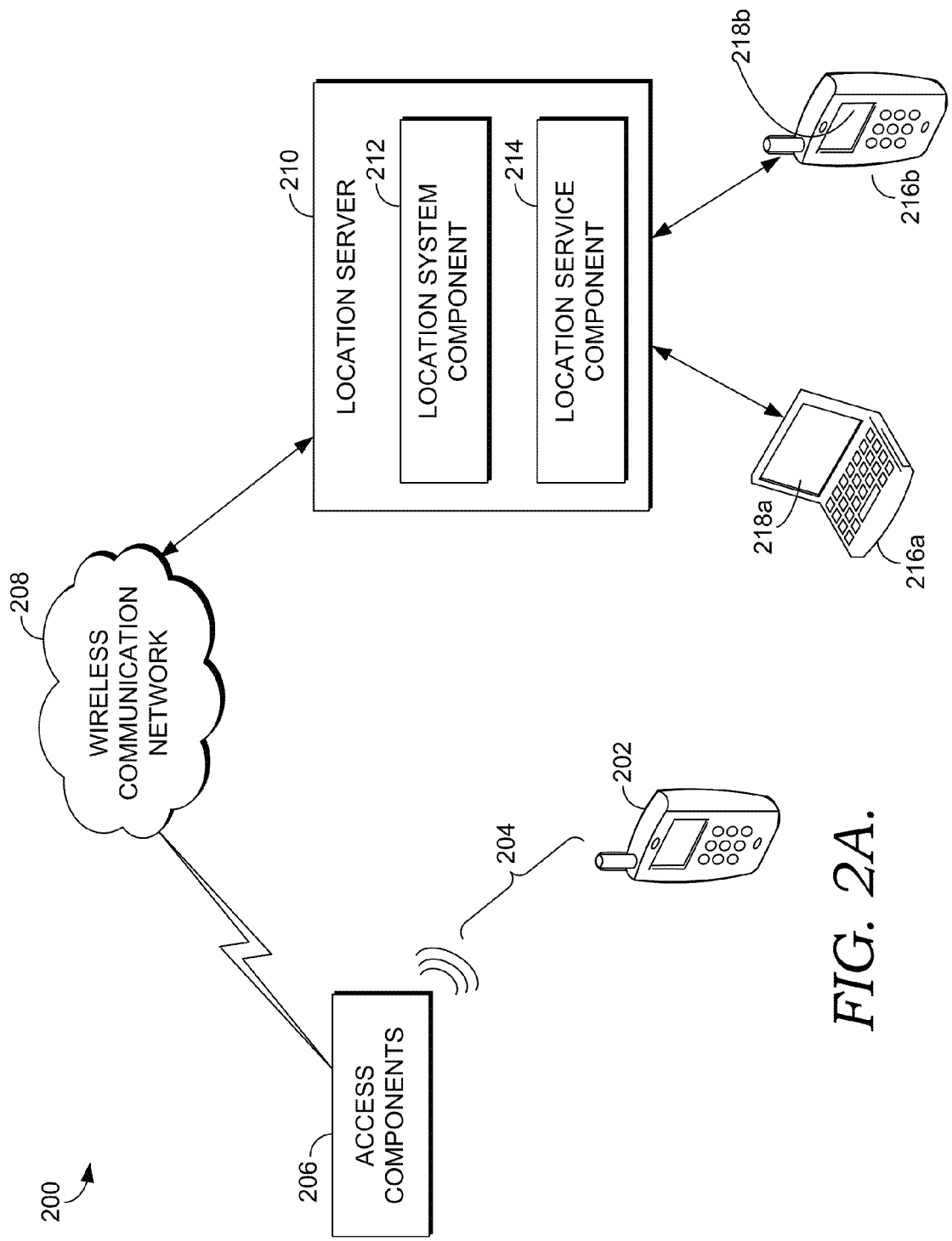
FIGS. 2A-2C depict an illustrative operating environment for carrying out embodiments of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

AFLT Advanced Forward Link Trilateration
BTS Base Transceiver Station
CDMA Code Division Multiple Access
GPS Global Positioning System
GSM Global System for Mobile communications (Groupe Special Mobile)
LTE Long Term Evolution
MDN Mobile Device Number
PDA Personal Data Assistant
RNC Radio Network Controller
TDMA Time Division Multiple Access
UMTS Universal Mobile Telecommunications System For purposes of a detailed discussion below, a mobile device associated with one or more location systems in described. Further, while embodiments of the present invention may generally refer to the components described, it is understood that an implementation of the techniques described may be extended to cases with different components carrying out the steps described herein. It is contemplated that embodiments of the present invention may utilize different types of location systems.

Embodiments of our technology may be embodied as, among other things, a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

A mobile device generally refers to a handheld computing device (e.g., handsets, smartphones or tablets). It may include a display screen with touch input and/or a miniature keyboard. The mobile device can run an operating system and various types of software. A mobile device may further function with a location system that can be used to determine the location of the mobile. In some cases, the mobile device may be located when it becomes, lost, misplaced, or missing, while in other cases, the mobile device may be used to locate a user associated with the mobile device. It is increasingly common for users to include a location service, for example, through the service provider of the mobile device, to help identify the location of the mobile device in several different types of situations.

A variety of different types of location systems exist for determining the location of a mobile device. Location systems generally fall into several broad categories including: network-based, handset-based, SIM-based, Wi-Fi-based and hybrid location systems. Network-based systems use the network of a service provider of the mobile device to identify and locate the mobile device. Handset-based systems use client software installed on the mobile device to determine the location. SIM-based systems use measurements determined at the mobile device. Hybrid systems use a combination of network-based and handset-based techniques. Wi-Fi data is used in Wi-Fi systems to locate mobile device. Further, locating a mobile device can be done through, radio signals between towers of a network of the mobile device or through a GPS. When a location is determined, the location comprises an uncertainty region such that the location is a central location of the uncertain region. The uncertainty region can be associated with an uncertainty shape that is used to denote the location of the mobile device on a location diagram.

The uncertainty of the location of the mobile device can be determined using location systems. The uncertainty may be determined such that it corresponds to an uncertainty region, and as used herein, the uncertainty region is a property of space in one or more directions, that may include measurements in length, width, and height. In other words, the uncertainty region is an expression of the calculated uncertainty. The location and the uncertainty region can be determined based on several different factors of the particular location system. In operation, and by way of example, one type of location system takes measurements of power levels and antenna patterns and uses the concept that a powered mobile phone communicates wirelessly with one of the closest base stations. A sector in which the mobile device is located and an approximation of the distance from the base station may be determined.

Triangulation, in particular, is enabled when a mobile device signal is identified by three or more cell towers. Geometrically, if the distance to an item for each of three distinct points can be calculated, an approximate location of the distance in relation to the three reference points may also be calculated. The geometric calculation is based on the mobile device signal to the tower and the estimated distance of the phone from each of the towers. The distance may be identified based in part on a communication to the mobile device and an acknowledgment communication back. Further, approximation may be done by interpolating signals between adjacent towers. Approximations of the location of the mobile device may differ based on several variables, such as, the network traffic and density of antenna towers. For example, with urban areas where there are many towers, it may be possible to achieve more certainty in identifying the location of a mobile device, in contrast to rural areas where there may be miles between antennas. As such, triangulation is only a moderately certain system that depends on several different variables.

Location approximations may further be based on multipath GPS constraints. GPS location systems may derive locations based on multipath results when a direct path to a receiver of the mobile device is blocked. The receiver may be blocked by the person, house, roof, trees, mountains, building etc., such that, the signal from the satellite is reflected by some object. At a basic level, multipath signals are radio signals that have traveled further than intended and as a result affect the location approximation of the GPS. Thus, the determined location of a mobile device may only be an approximation of the actual location of the mobile device. Other location systems similarly determine a location of a mobile device that is merely an approximation of the location. In this regard, the identified location is associated with an uncertainty region.

As previously mentioned, when a mobile device becomes, lost, misplaced, or missing, a location service may be used to identify a location of a mobile device. The location service can be accessed via a computing device (e.g., PC or web-enabled mobile device). In embodiments, a user may simply want to know details of their own current location. As such, using a mobile device associated with a location service, the user can identify the location of the mobile device. The location service can be, for example, offered by a service provider of the mobile device. A user can sign up for the location service and thereafter, access the location service to identify the location of a mobile device. Accessing the location service can be through, among other ways, a website or mobile device application. The location service includes an interface for receiving and facilitating the display of information for locating the mobile device. For example, the location service may provide fields for a username, password, phone number/MDN and other identification information. The location service interface further allows a user to locate a mobile device on a location diagram, for example, on a map or aerial photo. Several different graphical elements (e.g., uncertainty shapes as circles) may be used to display the location of the mobile device on the location diagram. In other cases, sub-regions within an uncertainty shape may be determined. Each sub-region may be associated with a different likelihood of the mobile device being located in the sub-region.

An observed tendency from users interacting with location system interfaces is that users incorrectly assume that a central location of the uncertainty region is the most likely location of the mobile device or the actual location of the mobile device. This is usually incorrect especially if the uncertainty region corresponds to a significant amount of uncertainty for the location. It is possible the user's perceived actual location may be off by several miles. As such, a display that communicates to the user the uncertainty of the location determined by a location system would deter users from making this assumption and also be a benefit in identifying the location of a mobile device more cautiously.

Embodiments of the present invention provide an efficient method for displaying location uncertainty of locations of mobile devices. In particular, the location of a mobile device, determined using a location system, is obscured on a location diagram with an obscuring feature (e.g. opacity-to-transparency gradient, blurring, shading, or pixilation). The location may be a central location of an uncertainty region. The location is obscured such that the location is not misidentified as the actual location of the mobile device. In this regard, the uncertainty region determines the extent of geographic data that is displayed based on a correlation between the uncertainty region and the extent of geographic data. The uncertainty region may further have a location score that indicates the likelihood of the mobile device being found in the uncertainty region. The uncertainty region may be associated with an uncertainty shape (e.g., circle). In embodiments, the uncertainty shape may have two or more sub-regions, where each may have a different likelihood of the mobile device being found within each sub-region.

An uncertainty region refers to a property of space that extends in one or more directions such that a likelihood exists that the mobile device is located within the uncertainty region. When a location of a mobile device is determined, the approximate location may be a central location in an uncertainty region. The uncertainty region of the location of the mobile device varies with each type location system. The uncertainty region determines an extent of geographic data that is displayed based on a correlation between the uncertainty region and the extent of geographic data. In embodiments, a location score, that indicates the likelihood that the mobile device is located within the uncertainty region, is further factored into determining the extent of geographic data displayed. The location associated with the uncertainty region may be communicated such that the location is displayed on the location diagram with the extent of geographic data using an obscuring feature. The obscuring feature may include graphical elements that reveal the location at the extent of geographic data associated the uncertainty region.

With continued reference to location systems that determine the location of the mobile device, a location system parameter, as used herein, refers to characteristics or attributes of the location system process that contribute to the uncertainty/certainty of a location. At a high level, a location system parameter may be a type of location system used. For example, a GPS versus an AFTL system, where both GPS and AFTL are attributes that indicate the certainty of a location of a mobile device, with GPS being more certain than the AFTL system. The location system parameters comprise variables of a particular location system that also indicate the certainty of the location of the mobile device. For example, an area of service where the mobile device is in communication with a base station is a characteristic that indicates the certainty of the location of the mobile device. In this regard, a likelihood (e.g., location score) of a mobile being located in a particular location can be calculated and factored into the extent of geographic data displayed. Different types of location system parameters may be associated with different location systems. For example, a location system parameter in a GPS location system may be the dilution of the precision factor. The location system parameter may also be the served distance between the mobile device radio and the radio of a base station (e.g., 30 feet in Bluetooth 1.0 Specification). In this regard, these location system parameters either alone or in combination may identify a location of the mobile device and the uncertainty region.

At a basic level, the uncertainty region corresponds and/or correlates with an extent of geographic data revealed for the identified location. It is contemplated that embodiments of the present invention may be implemented with variations on corresponding and/or correlating the uncertainty region with an extent of geographic data. In particular, the correlation may be such that the geographic details of a location likely to be misidentified to have the mobile device are obscured. For example, in one embodiment, no geographic data is revealed within the uncertainty region. A location of a mobile device is determined; the location has an uncertainty region of a 4 mile radius. When the location of the mobile device is displayed on the location diagram, a selected obscuring feature (e.g., opacity) may be used to block out any geographic data for the uncertainty region. It is contemplated that the selected obscuring feature could be a gradient obscuring feature (e.g., opacity-to-transparency). As such, the location most likely to be perceived as the actual location of the mobile device (e.g., a center of the uncertainty region) is shown as opaque. In this regard, the opacity-to-transparency feature becomes more transparent moving further away from the location most likely to be perceived as the actual location.

For purposes of a detailed discussion, the terms opacity and transparency are used to describe embodiments of the invention. The terms opacity and transparency correlate with, in some cases, a low extent of geographic data revealed and high extent of geographic data revealed respectively. For example, increasing the opacity refers reducing the extent of geographic data revealed on a location diagram and increasing transparency refers to increasing the extent of geographic data revealed. Opacity and transparency are merely examples of obscuring features that may be used with embodiments of the present invention. For example, blurring, pixilation, and zooming are additional examples of obscuring features that may be used to either increase the extent of geographic data revealed or decrease the extent of geographic data revealed.

In another variation of the correlation between the uncertainty region and the extent of geographic data revealed, the uncertainty region has sub-regions. The sub-regions may be part of an uncertainty shape of the uncertainty region. For example, the uncertainty region may be displayed using a circle for the uncertainty shape. The circle may include sub-regions (e.g., concentric circles) within the circle. As such, it is contemplated, as discussed before, that the location most likely to be perceived as the actual location of the mobile device (e.g., the smallest circle in the concentric circles) is shown as opaque. A gradient opacity feature may still be used as the obscuring feature. It is also contemplated that the entire uncertainty shape having sub-regions is displayed with an obscuring feature so no geographic data is shown.

In yet another embodiment, it is further contemplated that a location score that indicates the likelihood that the mobile device is in an uncertainty region or sub-region thereof is used to determine the extent of geographic data revealed. Each sub-region may further be associated with a different likelihood (i.e., location score) that the mobile device is one of the sub-regions. A location system parameter of the location system used in identifying the location of the mobile device may improve the likelihood of the mobile device being located within a certain region. The location system parameter refers to characteristics or attributes of the location system process that contribute to the certainty/uncertainty. In this regard, based on the location score, a location in the uncertainty region where the mobile is most likely to be is displayed with less geographic data than a location in the uncertainty region where the mobile device is less likely to be. In this example, a provider of a location service intends to hide the details of a location when is more certain than not that the mobile device is at the location. It is contemplated that the opposite correlation is possible in embodiments that aim to achieve other goals. As such, based on a location score that indicates a high likelihood for a position within an uncertainty region, more geographic details of the position are provided. In this example, a provider of a location service intends to show more details of a location when is more certain than not that the mobile device is at the location.

It is further contemplated that the uncertainty region and/or location score are associated with a threshold, such that, whether an obscuring feature is displayed depends on whether the threshold is or is not met. At a basic level, the uncertainty region may have to, by way of example, meet a certain size in order to display the uncertainty region with obscuring feature. For example, a radius of 4 miles may be displayed with an obscuring feature while a radius of 4 feet would not be displayed with an obscuring feature. Similarly, a location score may have to meet a threshold location score that indicates an amount of certainty in the identified location, which in turn triggers displaying the location with an obscuring feature to hide details. Otherwise, the location is displayed without the obscuring feature hiding details. In embodiments, meeting or not meeting the threshold may factor into the type of obscuring feature. It is further contemplated that the identified uncertainty region can correlate with a predefined extent of geographic data revealed.

With continued reference to examples of correlations between an uncertainty region and the extent of geographic data, a location system parameter may be proximity to the radio base station. In particular, an area served by the radio base station may be an indication of the certainty of the location. In operation, the area serviced by the radio base station, with which the mobile device is in communication, is represented as opaque. Because the location system parameter is an indication of certainty, the geographic data details of a location where the mobile device is likely to be located may be hidden. As discussed, this may be further based on meeting a threshold level. In the case where the relative signal strengths are used to provide improved mobile device location (i.e., reduce uncertainty), the location where the mobile device is not likely to be located can be shown as transparent (e.g., more geographic details).

Another example of a location system parameter relates to cellular communications, where a common perception of signal strength is by signal bars. The location system parameter in this case is the number of signal bars. As such, a lost or misplaced mobile device receiving 5 bars of signal strength would be shown with limited geographic data (e.g., more opaque). Whether a mobile device receives 5 bars at a particular location can be determined using drive test data. The geographic data may successively become more transparent (e.g., less opaque) for bands around the location where the mobile device is capable of receiving 5 bars. In cases where drive test data discloses that the mobile device can only receive 1 bar of signal strength, even then, the mobile device receiving 1 bar of signal strength would be shown as opaque in a region where the 1 bar could be received. It is reasoned that the mobile device radio under adverse radio frequency conditions may still be quite close to the base station and still receive a poor signal. As such, even with 1 bar of signal strength the location of the mobile device is still relatively certain.

As mention earlier, a location score may be determined for the uncertainty region. The location score can be based on a set of rules used to determine location of the mobile device. In this regard, the location score can be based on an uncertainty region and/or one or more location system parameters. The location score, as such, also correlates with an extent of geographic data revealed on a location diagram. By way of example, multi-signal mechanisms such as AFLT can be used such that the displayed geographic data is represented by a calculated location score. In an exemplary embodiment, when the location score is high (i.e., more certain than uncertain) an extent of geographic data revealed provides less details of the geographic location; while when the location score is low (i.e., more uncertain than certain) the extent of geographic data revealed provides more details of the geographic location. For example, a 2 Sigma location score that indicates a high confidence interval would be represented with less geographic data, and a 1 Sigma location score that indicates a low confidence interval would be represented with more geographic data. It is contemplated that less geographic data can be opaque while more geographic data may be increasingly transparent than opaque. In this example, the 1 Sigma regions would be halfway between opaque and transparent. It is contemplated that the opposite correlation is possible, where more details are revealed when the location is more certain, and vice versa.

In the case of GPS, where a dilution of precision measurement is a formal component of the measurement, the opacity is a function of the dilution of precision along provided axes. In another implementation, the display may consist of a gradient representation where the opacity at the edge of the least likely region is transparent and the opacity increases progressively to the highest density region. In yet another implementation, the extent of geographic data revealed is related to the zoom level of the display. At the highest zoom levels (most detailed representation) the opacity of the display is the highest. At the lowest zoom levels (least detailed representation) the opacity of the display is the lowest.

The location and an associated uncertainty region or location score may be referenced by a location service responding to a request to locate a mobile device. The location service can be accessed via a web-browser or mobile application interface. An obscuring feature can be selected to display with the identified location on a location diagram. It is contemplated that the obscuring feature may include any variations and combinations of a blurring effect, a pixilation effect, shading gradient effect, and a zoom effect. At a basic level, embodiments of the present invention provide for displaying the location of the mobile device based on a correlation between the uncertainty region and an extent of geographic data (e.g., details of a geographic location) revealed by an obscuring feature (e.g., opacity-to-transparency effect) for an identified location of the mobile device. This provides a significant advantage over conventional methods in that a user can be visually aware of the location uncertainty of the location of the mobile device; the obscuring feature hides or reveals geographic details of an identified location such that the user immediately knows of the location uncertainty.

In a first aspect of the present invention, computer-readable media having computer-executable instructions embodied thereon that, when executed, enable a computing device to perform a method for displaying location uncertainty of locations of mobile devices, are provided. The method includes determining a location of a mobile device using a location system. The method also includes identifying uncertainty region of the location. The uncertainty region determines an extent of geographic data that is displayed on a location diagram. The method also includes determining the extent of geographic data that corresponds to the uncertainty region. The method further includes communicating the location associated with the uncertainty region such that the location is displayed on the location diagram with the extent of geographic data using an obscuring feature.

In a second aspect of the present invention, computer-readable media having computer-executable instructions embodied thereon that, when executed, enable a computing device to perform a method for displaying location uncertainty of locations of mobile devices. The method includes receiving a request to locate a mobile device. The method also includes communicating the request to a location sever to locate the mobile device. The method further includes receiving a location of the mobile device having an uncertainty region. The uncertainty region determines an extent of geographic data that is displayed on a location diagram. The method includes displaying the location of the mobile device with an obscuring feature that reveals the location of the mobile device at the extent of geographic data that corresponds to the uncertainty region.

In a third aspect of the present invention, a system is provided for displaying location uncertainty of locations of mobile devices. The system includes a location server configured for receiving a request to locate a mobile device. The location server is also configured for determining a location of the mobile device based on a location system. The location server is further configured for identifying an uncertainty region used in determining the location of the mobile device. The uncertainty region determines an extent of geographic data that is displayed on a location diagram. The location server is also configured for determining the extent of geographic data that corresponds to the uncertainty region. The location server is further configured for identifying an obscuring feature for displaying the location of the mobile device at the extent of geographic data. The location server is configured for communicating the location associated with the uncertainty region and the obscuring feature such that the location is displayed on the location diagram with the extent of geographic data using the obscuring feature.

The system also includes a location service device configured for receiving the request to locate the mobile device. The location service device is also configured for communicating the request to the location server. The location service device is further configured for receiving the location of the mobile device. The location is determined using the uncertainty region that determines an extent of geographic data that is displayed on a location diagram. The location service device is configured for displaying the location of the mobile device with the obscuring feature that reveals the location of the mobile device at the extent of geographic data that corresponds to the uncertainty region.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include Long Term Evolution (LTE) and Evolved Data Optimized (EVDO) and the like. In some embodiments, radio 117 might also facilitate other types of wireless communications including Wi-Fi communications.

Input/output port 118 might take on a variety of forms. Illustrative input/output ports include an USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

FIG. 2A depicts an illustrative operating environment, referenced generally by the numeral 200, which enables a method for displaying location uncertainty of locations of mobile devices. The operating environment 200 includes a mobile device 202, access components 206, a wireless communications network 208, a location server 210 having a location system component 212 and a location service component 214, location service devices (e.g., computing device 216a and mobile phone 216b each with an associated display 218a and 218b respectively). It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Mobile device 202, in one embodiment, is the type of device described in connection with FIG. 1 herein. Mobile device 202 may communicate with a wireless communication network or other components not internal to the mobile device 202. In embodiments, mobile device 202 may make and receive telephone calls over a radio link while moving around wide geographic areas. In addition, mobile device 202 may support a wide variety of other services (e.g., text messaging, MMS, e-mail, internet access, short-range wireless communication, applications, and gaming). In particular, mobile device 202 may work with a location system associated with a location service for locating the mobile device. The location service of the mobile device can be provided by a service provider of the mobile device. The location system and location service communications to and from the mobile device 202 may be received at access components 206 and routed via the wireless communication network 208.

Mobile device 202 communicates with access components 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GSM, TDMA, LTE, and 802.16.

Mobile device 202 may include a client service (not shown) that facilitates carrying out aspects of the technology described herein. The client service may be a resident application on the mobile device, a portion of the firmware, a stand-alone website, or a combined application/web offering that is used to facilitate generating and transmitting information relevant to displaying location uncertainty of locations of a mobile device.

Generally, the access components 206 provide access to what some skilled artisans refer to as a telecommunications network e.g., wireless communications network 208, also termed a core network. A wireless communications network 208 may comprise one or more of the components illustrated in FIG. 2. Not all components that make up a wireless communications network are shown. Also, not all connections or possible connections are shown. The access components 206 may be one or more of a base transceiver station (BTS), a Wi-Fi router, a mobile hotspot, a switch and any other device that facilitates communication between mobile device 202 and network 208. In one embodiment, the access components 206 include both a Wi-Fi router and a BTS tower. In another embodiment, access components 206 may be BTS towers. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

With continued reference to FIG. 2A, the location server 210 is a collection of components (e.g., the location system component 212 and location service component 214) which provide for facilitating the display of location uncertainty for the locations of mobile devices. For example, the location server may communicate a location diagram with an extent of geographic data for an identified location of the mobile device for display via an interface. In operation, the location server communicates with location service devices (e.g., computing device 216a or mobile device 216b) to provide information in response to a location request associated with a mobile device (e.g., mobile device 202).

The location system component 212 is responsible for managing various services that are used to identify the location of a mobile device. As discussed, there are various types of location systems, as such, for purposes of a detailed discussion below; embodiments of the present invention are described with reference to, for exemplary purposes, a networked-based location system. In particular, examples of network-based location systems include location done through radio signals between towers of a network of the mobile device or through GPS. For example, cell tower triangulation is a popular technique for determining the location of a mobile device. Conventionally, antennas in cell towers are arranged in a triangle of three antenna arrays, with each antenna array covering up to a 120° sector having the tower at the center. In operation, cell tower triangulation methods require the knowledge of the actual locations of cell towers. Within each sector, a tower can make measurements of how far away a mobile device is transmitting a signal. The cell tower measures the signal strength and the round-trip signal time and uses the measurements to determine the location of the mobile device.

Figure 2B:
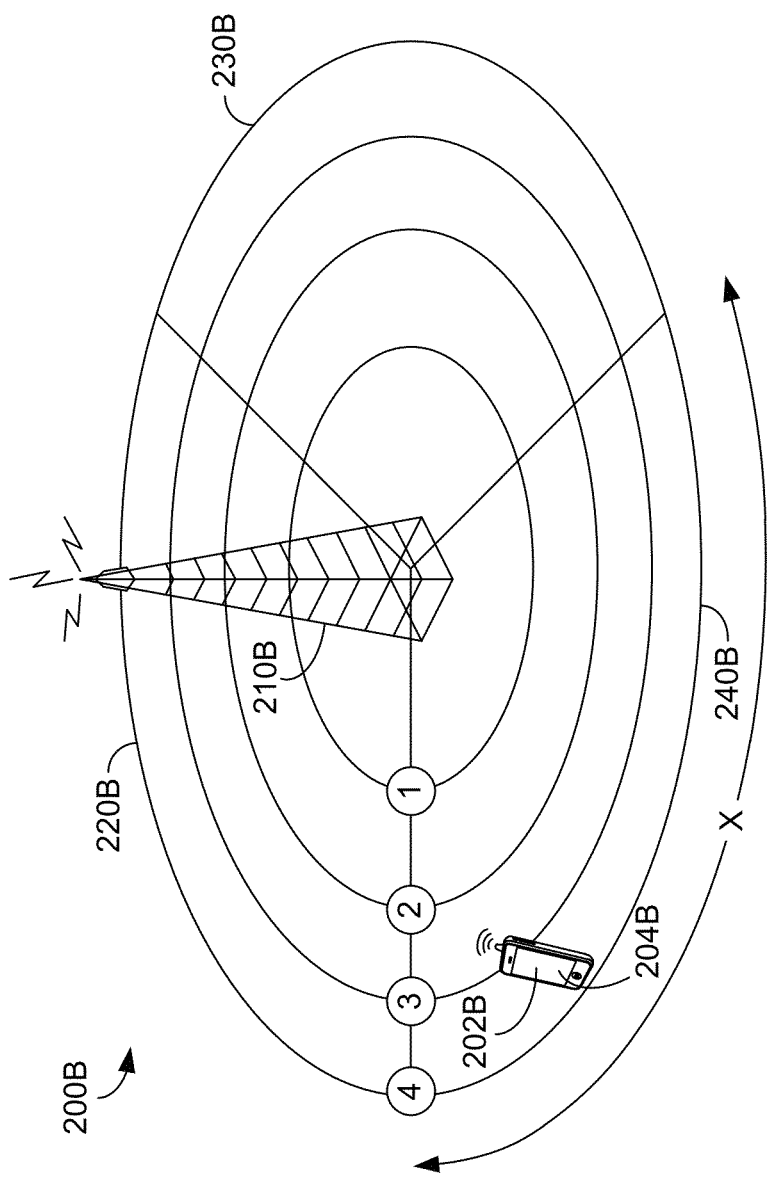
Figure 2C:
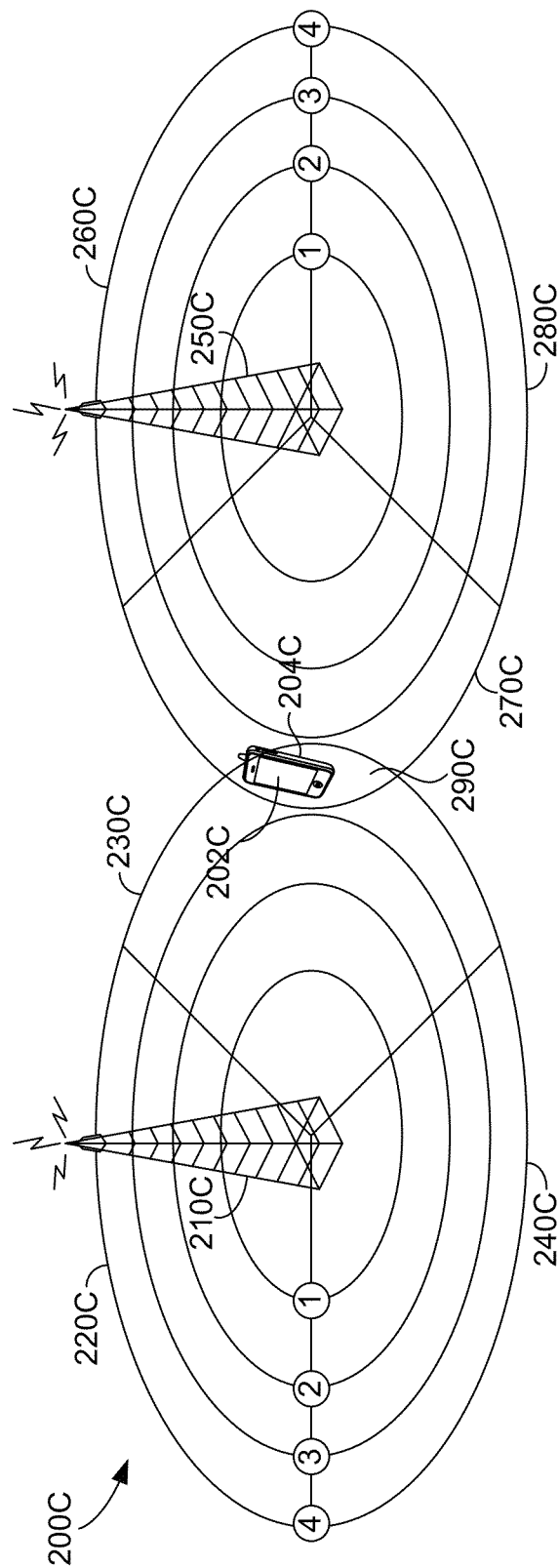

With reference to FIG. 2B, the exemplary diagram includes a single tower 210B having three sectors 220B, 230B, and 240B and several concentric bands of distance (e.g., 1, 2, 3, 4 in miles) from the tower. Each sector can be a distance (e.g., x) from one edge of the sector to a second edge of the sector. The cell tower determines that the signal is coming from sector 240B and that the origin of the signal is approximately 204B (e.g., 4 miles) from the tower. This also places the call within an approximate distance from either edge of the sector 240B. With reference to FIG. 2C, if the mobile device is also negotiating with a second cell tower at the same time, the ability to locate the mobile device 202C at a distance 204C gets much better. In this situation the phone is at 204C (e.g., 4 miles) from the 210C tower in the 230C sector, and 204C (e.g., 4 miles) from the 250C tower in the 270C/230C sector. This will place the phone in an overlap region 290C from which the location of the mobile device may be estimated.

Other calculations are reasonably well understood with location systems having established statistical and mathematical models for determining the location of objects. By way of example, in GPS calculations, the distance root mean squared (DRMS) is a single number that expresses 2D accuracy. In order to compute the DRMS of horizontal position errors, the standard errors from the known position in the directions of the coordinate axis are required. Standard errors of estimate coordinates (x, y) of each point being positioned can be predicted from corresponding variances on the diagonal of the covariance matrix. In the alternative, circular error probability (CEP) refers to the radius of a circle in which 50% of values occur, i.e., if a CEP of 5 ft is quoted then 50% of horizontal point position should be within 5 ft of the true location. The radius of 95% is often quoted and the term R95 used. R95 is CEP with the radius of the 95% probability circle. Other types of proximity shapes and associated probability calculations are possible using location system algorithms for identifying a location of a mobile device. Any and all such variations, and any combination of location systems, are contemplated to be within the scope of embodiments of the present invention.

The location system component 212 is also configured to identify an uncertainty region. An uncertainty region refers to a property of space that extends in one or more directions such that a likelihood exists that the mobile device is located within the uncertainty region. The uncertainty region corresponds and/or correlates with an extent of geographic data revealed for the location. In embodiments, identifying an uncertainty region includes identifying the location system used to determine the location of the mobile device. The location system is associated with a set of rules for determining the location of a mobile device. The set rules can be referenced to identify one or more location system parameters. The uncertainty region determined using one or more location system parameters of a location system. The location system parameters refer to variables of a particular location system that also indicate the certainty of the location of the mobile device. Different types of location system parameters may be associated with different location systems. For example, a location system parameter in a GPS location system may be the dilution of the precision factor. The location system parameter may also be the served distance between the mobile device radio and the radio of a base station (e.g., 30 feet in Bluetooth 1.0 Specification). In this regard, these location system parameters either alone or in combination may be identified as the uncertain parameter.

Figure 3:
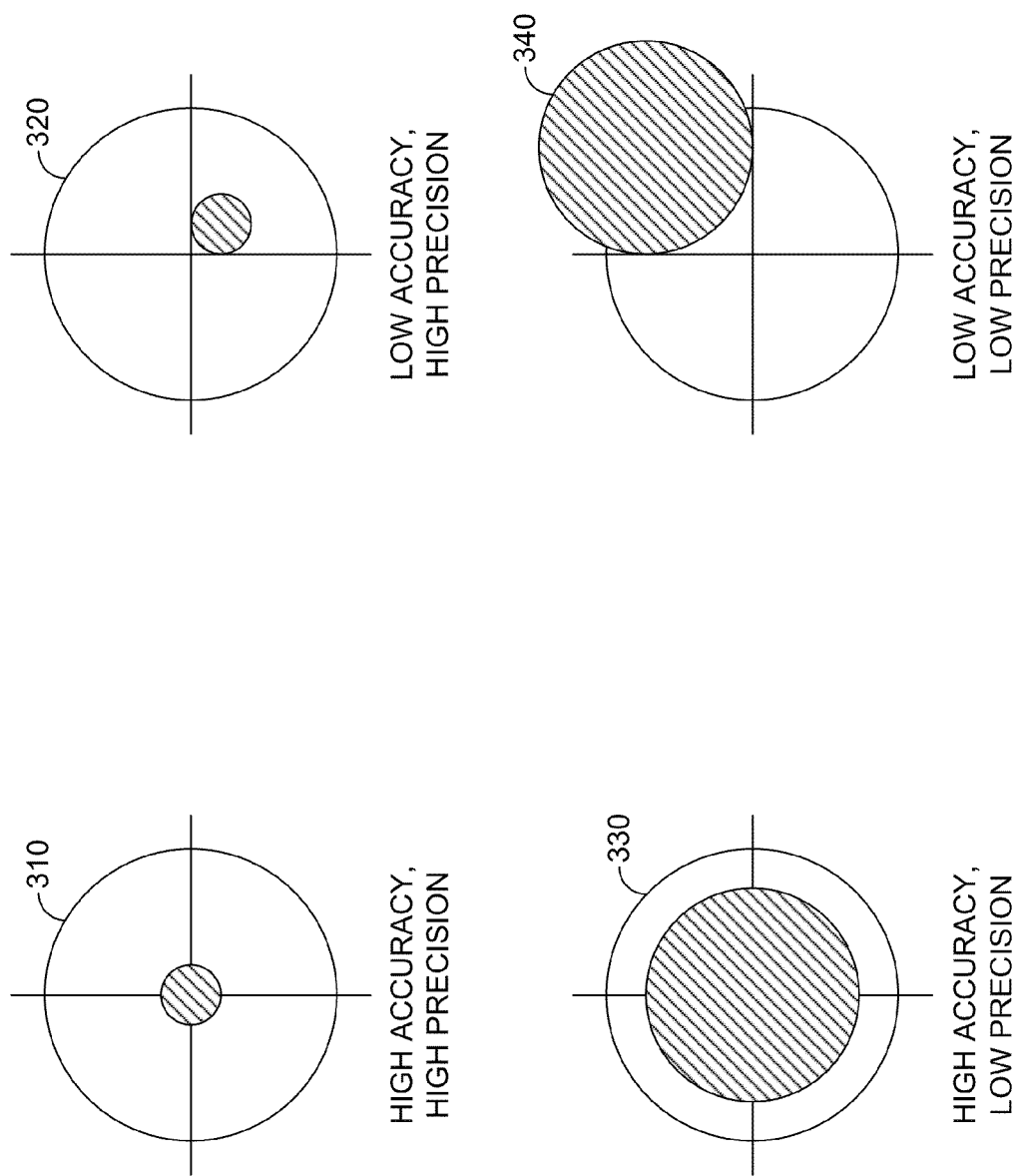
FIG. 3 depicts a schematic illustrating a method for displaying location uncertainty of locations of mobile devices, in accordance with an embodiment of the present invention.

The uncertainty of a location within an uncertainty region can be based on the accuracy and/or precision of the location system. A distinction may be made between accuracy and precision. Accuracy refers to the degree of closeness of an estimate to its true but unknown location and the precision is the degree to which the closeness of the estimate is expressed. In this regard, with reference to FIG. 3, a location 310 may have high accuracy, high precision, a location 320 may have low accuracy, high precision, a location 330 may have high accuracy, low precision, and a location 340 low accuracy, low precision. In this regard, the accuracy and precision factor into deriving the uncertainty region associated with the location.

The location system component 212 is further responsible for tracking a location score for a location of the mobile device. A location score is generated using a set of rules comprising one or more location system parameters. In this regard, the location score is based on an approximation technique of the location system (e.g., triangulation or GPS) as described above. By way of example, triangulation may include location system parameters such as proximity between cell towers because, in densely populated urban areas, the cell towers are close together, and a much closer estimation of phone location can be made than in a rural area, where the towers are far apart. The proximity location system parameter can be used to determine a location score. In multi-signal mechanisms such as AFLT, a location score can be calculated, for example, a 2 Sigma location score that indicates a high confidence interval and a 1 Sigma location score that indicates a low confidence interval. The uncertainty region and/or location score are used to identify an extent of geographic data that is displayed on a location diagram.

With continued reference to FIG. 2A, the location service component 214 is generally responsible managing and integrating features of locating a mobile device. The location service component 214 may serve an application (e.g., client application on a mobile device) which in turn serves the user through an interface. In embodiments, the client application performs one or more of the functions of the location service component 214 described herein. The location service component 214 communicates with the location system component 212 to retrieve and/or reference the location the mobile device. The location is determined using an uncertainty region, as discussed above, which the location service component 214 utilizes in facilitating the generation of portions of the user interface at an extent of geographic data that corresponds to the uncertainty region. In particular, the location service component 214 manages geographic data that is displayed based on a correlation with uncertainty region of the location of the mobile device.

The location service component 214 is configured to determine an extent of geographic data that is displayed on a location diagram. The geographic data may be stored in one or more geographic databases that include representations of geographic features in the geographic region. The geographic database includes information about the represented geographic features, such as roads, portions of roads, address ranges and so on. The geographic data may also include points of interest, such as restaurants, hotels, airport, and residential homes. The location service component 214 facilitates graphically displaying maps of geographic areas, for example, on a location diagram or aerial photo, to indicate the location of the mobile device. The use of the term geographic data should not be construed as limiting, in that, geographic data may include additional graphical elements on location map for displaying a location of mobile device.

It is contemplated that the location service can be associated with a location application. The location application can be accessed with a computing device or mobile device (e.g., 216a and 216b) having a display (e.g., 218a and 218b). Computing device 216a and mobile device 216b may include components similar to those described herein with reference to FIG. 1 and mobile device 202. Computing device 216a and mobile device 216b may further access components in FIG. 2A in a manner similar to mobile device 202. As such, the location service component 214 via the location application can facilitate the display of and identified extent of geographic data to be displayed for a location. In embodiments, the uncertainty regions and/or location scores are associated with predefined extents of geographic data; however, in other embodiments additional factors (e.g., features of the geographic data in the location) may further, or in the alternative, determine how much geographic data is revealed. For example, an area of service uncertainty region may correspond to no geographic data revealed, as such, an opaque obscuring feature is used to display the location on a location diagram. However, the area of service uncertainty region may correspond to displaying some level of geographic data when the geographic data includes different types of geographic features e.g., such as roads, portions of roads, and sparse address ranges. Any variations and combinations thereof are contemplated with embodiments of the present invention.

The displayed graphical maps can further include features that allow the user to interact with the map. By way of example, the location data may include a zoom feature that allows a user to zoom from an initial-zoom-depiction to a second-zoom-depiction. The user may either zoom-in or zoom-out from the initial-zoom depiction corresponding to the larger and smaller scale of the location diagram. With zooming-in or zooming-out the map data may further be updated to include, for example, additional geographic data and remove geographic data respectively. An initial-zoom-depiction may be an aerial photo view of a location and a zoom-out-depiction may include less geographic details provided in a map view. Any variations and combinations of views and interactions are contemplated with embodiments of the present invention.

The location service component 214 also manages and integrates uncertainty shapes for communicating the location of a mobile device. As discussed above, an uncertainty shape represents a region within which the mobile device is located or within which the mobile device is likely to be located. The location service component 214 may reference an uncertainty shape calculated by the location system component 212 and provide the uncertainty shape for display on a location diagram. The uncertainty shape can be associated with different types of obscuring features to denote the location uncertainty of the location of the mobile device. In one embodiment, the uncertainty shape is a circle, where the circle includes an opacity-to-transparency effect. In another embodiment, the uncertainty shape is made up of several concentric circles each associated with a different obscuring feature. Any variations and combinations of uncertainty shapes are contemplated with embodiments of the present invention.

The location service component 214 is also responsible for integrating obscuring features into the displayed geographic data. The obscuring features are introduced as a function of the uncertainty region that correlates with an amount of geographic data detail that should be displayed. An obscuring feature can be selected and displayed within the identified location on a location diagram. It is contemplated that the obscuring feature may include any variations and combinations of an opacity-to-transparency effect, a blurring effect, a pixilation effect, shading gradient effect, and a zoom effect. As discussed, by way of example in FIGS. 4 and 5, the location service component 214 and/or location service device selects an obscuring feature (e.g., an opacity-transparency effect) such that the geographic data provided for locating the mobile device is obscured commensurate to the uncertainty region such that the location uncertainty is immediately conveyed via the user interface to the user.

Figure 4A:
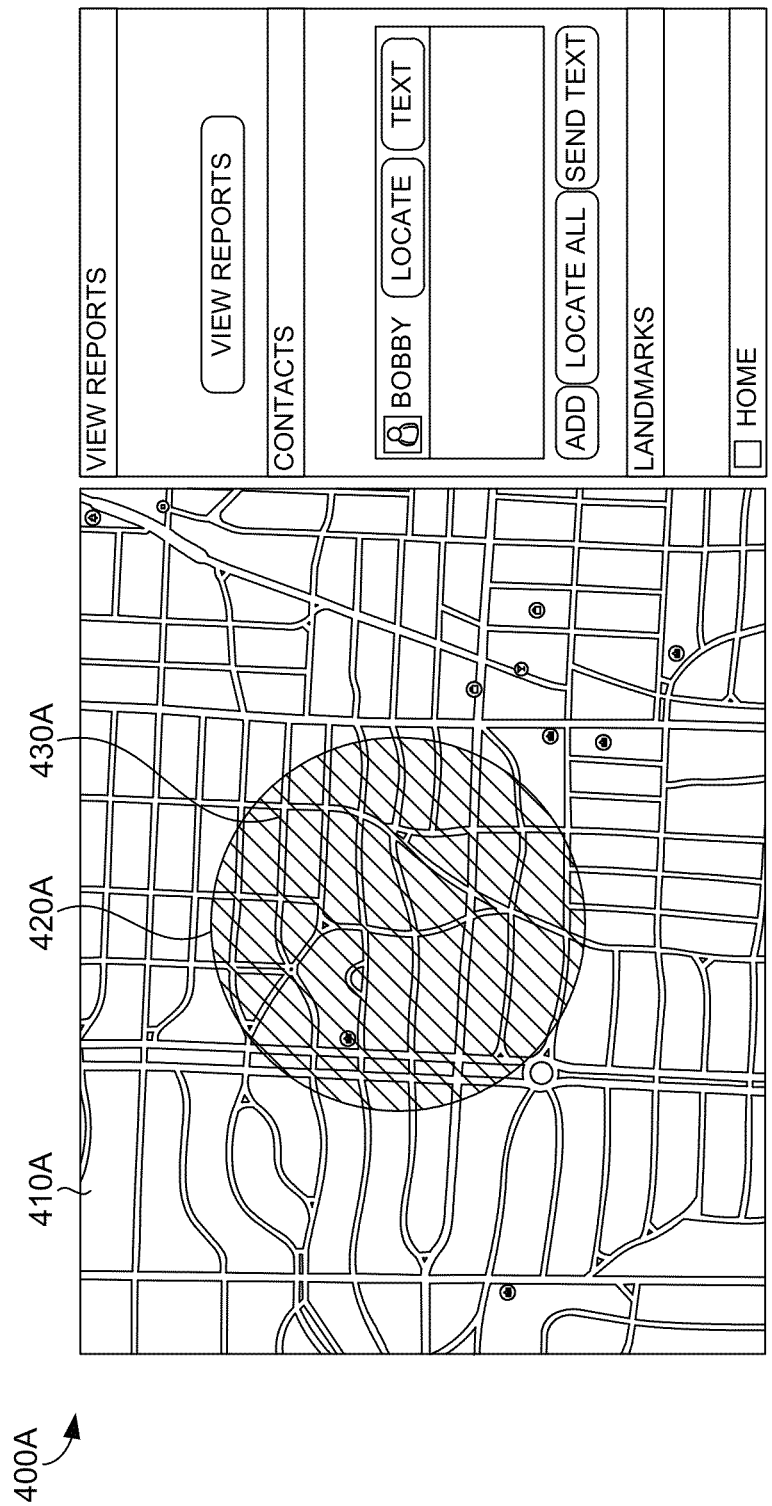
FIGS. 4A-4B depict schematics illustrating a method for displaying location uncertainty of locations of mobile devices, in accordance with an embodiment of the present invention.

FIG. 4A shows an exemplary location service interface 400A having a location diagram 410A of a geographic region. The geographic region may correspond to a metropolitan or rural area, a state, a country, or combination thereof or any other area. Locations in the geographic region are physical features such as roads, points of interest, and different bodies of water. The calculated location of the mobile device may be within the uncertainty shape 420A. The uncertainty shape 420A has an obscuring feature 430A. The obscuring feature displayed on the location diagram allows the location to be displayed with the extent of geographic data that corresponds to the uncertainty region.

In one embodiment, it is contemplated that the uncertainty region and/or location score are associated with a threshold, such that, whether an obscuring feature is displayed depends on whether the threshold dimension is or is not met. At a basic level, the uncertainty region may have to, by way of example, meet a certain size in order to display the uncertainty region with obscuring feature. For example, a radius of 4 miles may be displayed with an obscuring feature while a radius of 4 feet would not be displayed with an obscuring feature. Similarly, a location score may have to meet a threshold location score that indicates an amount of certainty in the identified location, which in turn triggers displaying the location with an obscuring feature to hide details. Otherwise, the location is displayed without the obscuring feature hiding details. In embodiments, meeting or not meeting the threshold may factor into the type of obscuring feature. It is further contemplated that the identified uncertainty region can correlate with a predefined extent of geographic data revealed.

Figure 4B:
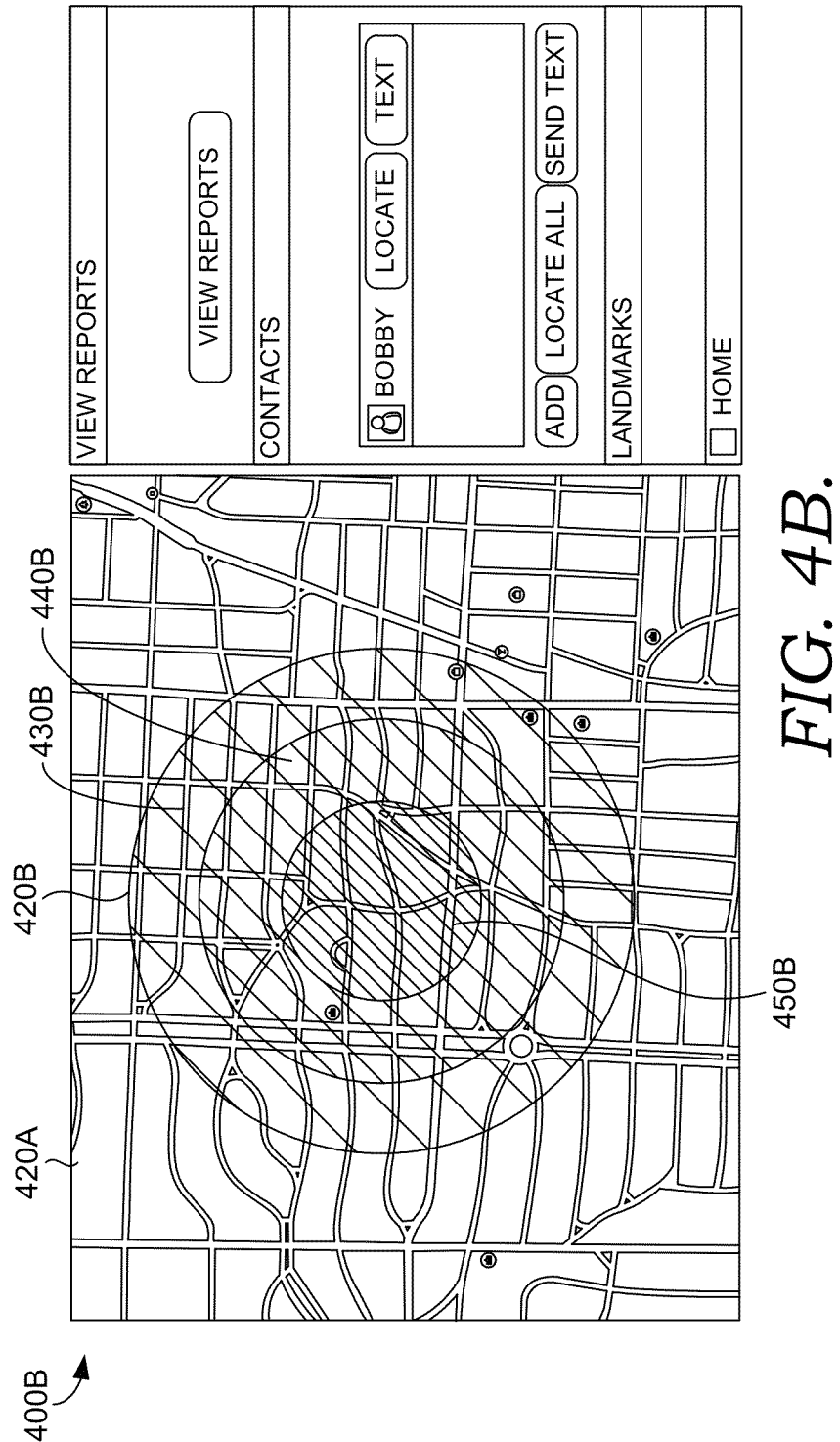

FIG. 4B illustrates an exemplary location service interface 400B having a location diagram 410B of a geographic region. The calculated location of the mobile device may be within the uncertainty shape 420B. The uncertainty shape includes concentric circles having sub-regions within the uncertainty shape. Each of the sub-regions is associated with a different obscuring feature (e.g., 430B, 440B, and 450B). In embodiments, the uncertainty shape may be a single uncertainty shape with a gradient of an obscuring feature or two or more obscuring features each associated with a different extent of geographic data for the location of the mobile device. In this regard, a single obscuring feature can disclose different levels of geographic data for a location of a mobile device, and alternatively or in combination multiple obscuring elements can disclose different levels of geographic data for the location of a mobile device. Each extent of geographic data revealed may be based on a different location score.

Figure 5A:
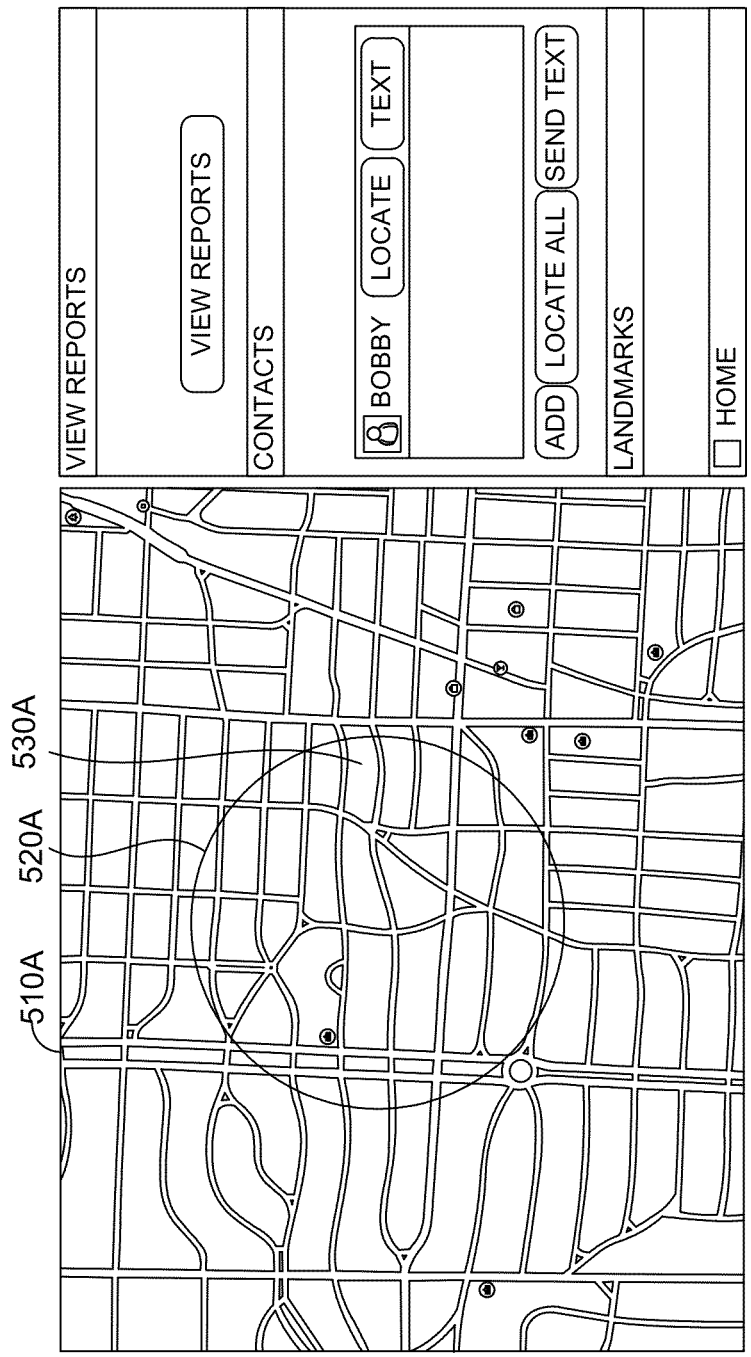
FIGS. 5A-5B depict schematics illustrating a method for displaying location uncertainty of locations of mobile devices, in accordance with an embodiment of the present invention.
Figure 5B:
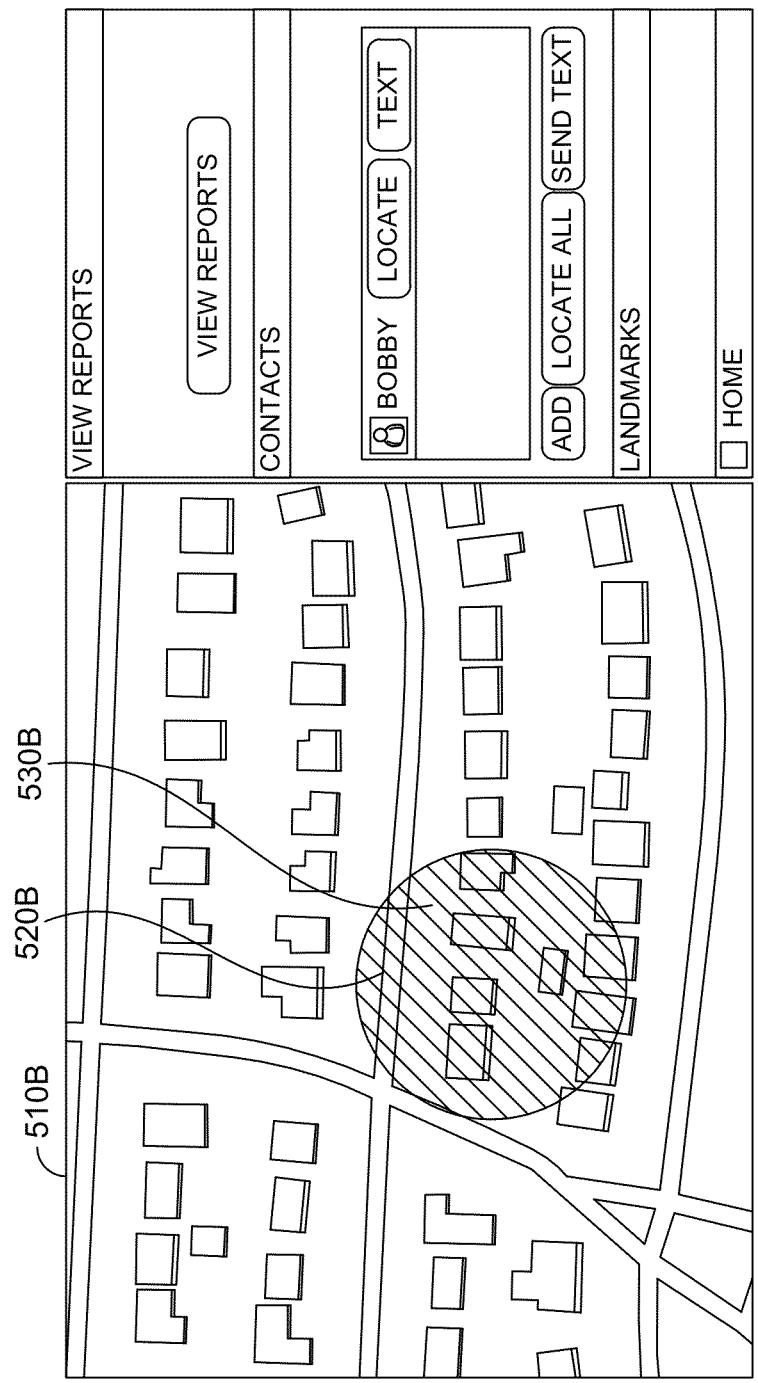

FIGS. 5A and 5B show exemplary displays of a zooming obscuring feature. In particular, the location service interfaces illustrate location diagrams (510A and 510B) of a geographic region each having an uncertainty shape (520A and 520B). The zooming obscuring feature operates such that at the lowest zoom levels (least detailed representation—FIG. 5A) the opacity of the display is the lowest (530A) and at the highest zoom levels (most detailed representation—FIG. 5B) the opacity of the display is the highest (530B). In this regard, the user immediately recognizes a degree of uncertainty associated with the identified location of the zooming obscuring feature. The size of the uncertainty shape may or may not change at the different levels of zooms. It is also contemplated that the zooming obscuring feature can be used in combination with other obscuring features.

Figures 6, 7:
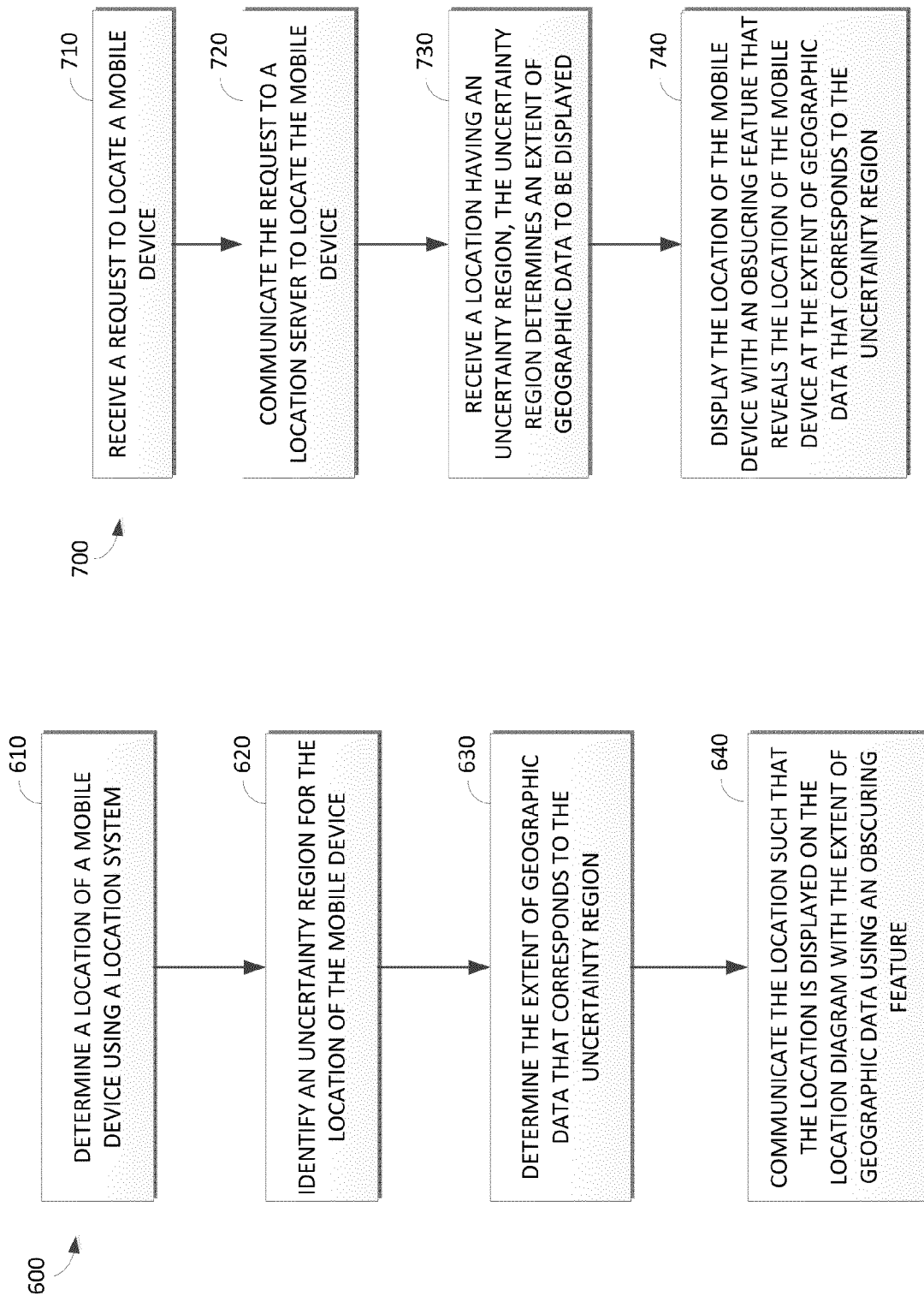
FIG. 6 depicts a flowchart illustrating a method for displaying location uncertainty of locations of mobile devices, in accordance with an embodiment of the present invention.
FIG. 7 depicts a flowchart illustrating a method for displaying location uncertainty of locations of mobile devices, in accordance with an embodiment of the present invention.

Referring to FIG. 6, a flowchart illustrates a method 600 for displaying location uncertainty of locations of mobile devices. Initially, at step 610, a location of the mobile device is determined using a location system. The mobile device may have both a primary location system and a backup location system. The primary location system can be a more certain system than the backup location system. In embodiments, when the primary location system is unavailable at the mobile device, the backup location system is used to determine the location of the mobile device.

At step 620, an uncertainty region is identified for the location of the mobile device. The uncertainty region may be associated with any one of a network-based location system, a handset-based location system, a subscriber identity module (SIM)-based location system, and a Wi-Fi-based location system. The uncertainty region determines an extent of geographic data that is displayed on a location diagram. In embodiments, identifying the uncertainty region includes identifying a location system used to determine the location of the mobile device, referencing a set of rules of the location system that identify the location of the mobile device, where the set of rules is associated with one or more location system parameters that are used in determining the location of the mobile device. The uncertainty of a location having the uncertainty region may indicate an accuracy of the location or a precision of the location, where each of the accuracy and the precision are computed in part using the one or more location system parameters of the location system.

At step 630, the extent of geographic data that corresponds to the uncertainty region is determined. In embodiments, identifying the extent of geographic data includes generating a location score for the uncertainty region. The location score indicates a level of uncertainty for the location of the mobile device. In embodiments, a location score may be determined based on the uncertainty region. The location score may also be based on an approximation technique of the location system. In particular, the location score can be based on a set of rules used to determine location of the mobile device. In this regard, the location score can be based one or more location system parameters of the location system, with the location score also correlating with an extent of geographic data revealed on a location diagram. The extent of geographic data for displaying the location can be based on the extent of geographic data that correlates with the location score. At step 640, the location associated with the uncertainty region is communicated such that the location is displayed on the location diagram with the extent of geographic data using an obscuring feature.

FIG. 7 depicts a flowchart illustrating a method 700 for displaying location uncertainty of locations of mobile devices. At step 710, a request is received to locate a mobile device. At step 720, the request is communicated to a location sever to locate the mobile device. At step 730, a location of the mobile device is received. The location is associated with an uncertainty region that determines an extent of geographic data that is displayed on a location diagram. In embodiments, the location further includes the location score that is also or in the alternative used in displaying the location at the extent of geographic data. The location score may further be based on the accuracy and/or precision information for the location determined by the location system.

At step 740, the location of the mobile device is displayed with an obscuring feature that reveals the location of the mobile device at the extent of geographic data that corresponds to the uncertainty region. Any number of variations and combinations of obscuring features are contemplated with embodiments of the present invention. One or more sub-regions of the uncertainty shape may define a region within which the mobile device is located where each region is associated with a different location score. Each of the one or more sub-regions may be displayed with the same of a different obscuring feature. It is contemplated that displaying the location of the mobile device further comprises displaying a textual explanation of an uncertainty of the location of the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. Non-transitory computer-readable media having computer-executable instructions embodied thereon that, when executed, enable a computing device to perform a method for displaying location uncertainty of locations of mobile devices, the method comprising:
   determining a location of the mobile device using a location system;
   identifying an uncertainty region of the location, wherein the uncertainty region determines an extent of geographic data that is displayed on a location diagram;
   determining the extent of geographic data that corresponds to the uncertainty region; and
   communicating the location associated with the uncertainty region such that the location is displayed on the location diagram with the extent of geographic data using an obscuring feature.

2. The media of claim 1, wherein the location is associated with at least one of:
   an accuracy attribute of the location; and
   a precision attribute of the location, wherein each of the accuracy and the precision are computed in part using one or more location system parameters of the location system.

3. The media of claim 1, wherein identifying the uncertainty region further comprises:
   identifying the location system used to determine the location of the mobile device;
   referencing a set of rules of the location system that identify the location of the mobile device, wherein the set of rules is associated with one or more location system parameters that are used in determining the location of the mobile device; and
   identifying the uncertainty region for the location based on one or more location system parameters.

4. The media of claim 1, wherein the extent of geographic data that corresponds to the uncertainty region is such that all geographic data within the uncertainty region is obscured by the obscuring feature.

5. The media of claim 1, wherein the extent of geographic data that corresponds to the uncertainty region is such that an opacity-to-transparency obscuring feature is selected to be displayed at a central portion of the uncertainty region with opacity and at a peripheral portion of the uncertainty region with transparency.

6. The media of claim 1, wherein determining the extent of geographic data that corresponds to the uncertainty region further comprises determining whether the uncertainty region meets a threshold dimension, such that, when the uncertainty region falls below the threshold dimension no geographic data is obscured and when the uncertainty region is above the threshold dimension at least a portion of geographic data is obscured.

7. The media of claim 1, wherein the location is associated with two or more sub-regions of an uncertainty shape, each sub-region having a location score that indicates the likelihood of the mobile device being located within each of the two or more sub-regions, and wherein a first sub-region with a higher location score is more obscured than a second sub-region with a lower location score.

8. The media of claim 7, wherein location score is determined based on one or more location system parameters associated with the location system.

9. A method for displaying location uncertainty of locations of mobile devices, the method comprising:
   receiving a request to locate a mobile device;
   communicating the request to a location sever to locate the mobile device;
   receiving a location having an uncertainty region, wherein the uncertainty region determines an extent of geographic data that is displayed on a location diagram; and
   displaying the location of the mobile device using an obscuring feature that reveals the location on the location diagram at the extent of geographic data that corresponds to the uncertainty region.

10. The method of claim 9, wherein the obscuring feature comprises one or more selected from:
    an opacity-to-transparency effect;
    a blurring effect;
    a pixilation effect
    a shading gradient effect; and
    a zoom effect.

11. The method of claim 10, wherein the obscuring feature is the opacity-to-transparency effect, wherein an uncertainty shape is increasingly more opaque in a portion more central to the uncertainty shape and increasingly more transparent a portion more peripheral to the uncertainty shape.

12. The media of claim 9, further wherein the location is associated with a location score, wherein the location score indicates the likelihood of the mobile device being at location such that the location score is factored into determining the extent of geographic data displayed.

13. The method of claim 12, further comprising determining whether the location score of the location meets a threshold location score, wherein when it is determined that the location score meets the threshold location, the uncertainty region of the location corresponds to no geographic data being displayed in the uncertainty region.

14. The method of 13, wherein each of one or more sub-regions of an uncertainty shape is associated with a different location score, wherein each of the one or more sub-regions is displayed with a different obscuring feature.

15. The method of claim 9, further comprising identifying the obscuring feature upon receiving the location associated with the uncertainty region, wherein a selected obscuring feature is selected based in part on one or more attributes of the uncertainty region.

16. The method of claim 9, wherein displaying the location of the mobile device further comprises displaying a textual explanation of the uncertainty region of the mobile device.

17. A system for displaying location uncertainty of locations of mobile devices, the system comprising:
 a location server configured for:
  receiving a request to locate a mobile device;
  determining a location of the mobile device using a location system;
  identifying an uncertainty region used in determining the location of the mobile device, wherein the uncertainty region determines an extent of geographic data that is displayed on a location diagram;
  determining the extent of geographic data that corresponds to the uncertainty region;
  identifying an obscuring feature for displaying the location of the mobile device at the extent of geographic data; and
  communicating the location associated with the uncertainty region and the obscuring feature such that the location is displayed on the location diagram with the extent of geographic data using the obscuring feature; and
 a location service device configured for:
  receiving the request to locate the mobile device;
  communicating the request to the location server;
  receiving the location having the uncertainty region, wherein the uncertainty region determines the extent of geographic data that is displayed on a location diagram;
  displaying the location of the mobile device using the obscuring feature that reveals the location on the location diagram at the extent of geographic data that corresponds to the uncertainty region.

18. The method of claim 17, wherein the mobile device comprises:
 a primary location system; and
 a backup location system, wherein the primary location system is more certain than the backup location system, and wherein the primary location system is unavailable at the mobile device such that the backup location system is used to determine the location of the mobile device.

19. The system of claim 17, wherein determining the extent of geographic data that corresponds to the uncertainty region further comprises determining whether the uncertainty region meets a threshold dimension, such that, when the uncertainty region falls below the threshold dimension no geographic data is obscured and when the uncertainty region is above the threshold dimension at least a portion of geographic data is obscured.

20. The system of claim 17, wherein determining the extent of geographic data that corresponds to the uncertainty region further comprises:
 generating a location score for the location, wherein the location score indicates a likelihood of the mobile device being found at the location; and
 identifying the extent of geographic data for displaying the location based on the location score such that when the location score indicates a high likelihood of the mobile device being at the location the a low extent of geographic data is identified and when the location score indicates a low likelihood of the mobile device being at the location a high extent of geographic data is identified.

* * * * *